United States Patent [19] [11] Patent Number: 4,874,992
Benson et al. [45] Date of Patent: Oct. 17, 1989

[54] CLOSED LOOP ADAPTIVE RASTER DEFLECTION SIGNAL GENERATOR

[75] Inventors: David J. Benson, Newington, Conn.; James A. Burroughs, San Jose, Calif.

[73] Assignee: Honeywell Inc., Minneapolis, Minn.

[21] Appl. No.: 228,615

[22] Filed: Aug. 4, 1988

[51] Int. Cl.[4] .................. H01J 29/70; H01J 29/54; H04N 5/06
[52] U.S. Cl. .................................. 315/387; 315/367; 315/398; 358/150
[58] Field of Search ............... 315/367, 387, 388, 389, 315/398, 403; 358/137, 153, 140, 150, 151

[56] References Cited

U.S. PATENT DOCUMENTS

| | | | |
|---|---|---|---|
| 4,149,264 | 4/1979 | Hamada et al. | 364/900 |
| 4,314,183 | 2/1982 | Heuze et al. | 315/389 |
| 4,644,340 | 2/1987 | Holloway et al. | 340/749 |
| 4,709,268 | 11/1987 | Akimoto et al. | 358/150 |
| 4,729,024 | 3/1988 | Kawai et al. | 358/150 X |
| 4,779,132 | 10/1988 | McBeath et al. | 358/150 X |

Primary Examiner—Thomas H. Tarcza
Assistant Examiner—Gregory C. Issing
Attorney, Agent, or Firm—Seymour Levine; Albin Medved; Roger W. Jensen

[57] ABSTRACT

A raster deflection signal generator that generates deflection signals in accordance with sweep control signals provided by a programmable timing generator. The programmable timing generator stores digital signals representative of the desired sweep control signals so as to tailor the sweep timing to the input video channel. The digital sweep control signals are synchronized to the input video channel by locking a horizontal sync pulse generated by the programmable timimg generator to the horizontal sync pulse of the video input channel by a phase locked loop. Each deflection sweep is compared to a threshold voltage representative of screen center to provide a duty cycle signal in accordance with drift of the TV image from screen center. The duty cycle signal is filtered and sampled and fed back to the sweep generator so as to maintain the deflection sweeps properly centered.

9 Claims, 5 Drawing Sheets

CLOSED LOOP ADAPTIVE RASTER DEFLECTION SIGNAL GENERATOR

This invention was made with United States Government support and the United States Government has certain rights therein.

BACKGROUND OF THE INVENTION

1. Field of the Invention

The invention relates to displays such as cathode ray tube (CRT) displays, particularly with respect to generating the raster deflection control signals therefor.

2. Description of the Prior Art

Cathode ray tube displays for conveying television picture information are ubiquitous in present day technologies. For example, complex avionics systems utilize cathode ray tube displays to replace many formally mechanical flight instruments as well as to additionally provide other complex display information to the operator. Generally, the data is provided in the form of a television raster scan or in the form of calligraphic stroke written symbology. Such avionics systems require the presentation of the television raster images with accurately positioned stroke written symbols overlayed thereon. Modern aircraft instrumentation of this type is frequently referred to as a "glass cockpit". Such avionics systems often utilize a plurality of television sensor inputs with diverse video formats to be displayed on a plurality of display devices. Each display processing channel must synchronize its operation to the diverse timing information present in the television input signals. Specifically, horizontal and vertical synchronizing pulses permit a picture image to be properly placed up a CRT screen. Each of the television signal inputs can vary in its timing characteristics adversely affecting the positional accuracy of the presentation. The positional accuracy problem is further exacerbated in modern complex avionics systems because of the large number of distinct input and output signal characteristics.

The signals required to drive the CRT displays comprise primarily a video or intensity electrical signal, the instantaneous amplitude of which translates into a proportional intensity on the CRT screen and a pair of periodic sawtooth deflection control signals. The deflection signals are denoted as horizontal or X and vertical or Y deflections and comprise electrical signals with amplitudes resulting in proportional deflections from the CRT screen center in the respective horizontal and vertical directions.

In order to provide a set of signals of the correct characteristics, resettable integrators are utilized to provide the linear deflection sweeps. Conventional deflection generators are, however, subject to inaccuracies in the generation circuitry. These inaccuracies result from the timing variations discussed above as well as because of drift in component characteristics due to environmental conditions such as variations in temperature.

Several methods are utilized in the prior art to overcome these inaccuracies. Firstly, overscanning may be utilized wherein the picture size is expanded until the image size significantly exceeds the screen size. Although overscanning eliminates objectionable blank areas at the CRT screen edges and permits the deflection generation characteristics to drift without noticeably disturbing the image, overscanning is unacceptable for avionics applications, particularly in military systems, since a loss of picture information and positional accuracy occurs in the offscreen area.

A second prior art solution involves precisely adjusting the characteristics of each deflection generator. This solution requires the use of high precision and temperature stable electrical components to generate a precisely placed image. Each of the X and Y deflection signal generators is precisely adjusted by the use of signal offset and gain adjustment trimming mechanisms. This approach is cumbersome for multiple sensor applications since a new adjustment value must be provided for each sensor input. The solution becomes inordinately complex when a large number of systematic timing variations must be accommodated. In the prior art, individual sensor variations are accommodated by attempting to design and match an analog deflection network to each of a number of input characteristics by utilizing analog switching means.

SUMMARY OF THE INVENTION

The present invention utilizes a programmable timing generator to convert the timing information in the television sensor input signals into sweep signals corrected for timing variations by digital data stored in the programmable timing generator. The sweep signals are applied to closed loop adaptive deflection signal generators that maintain the sweeps screen centered irrespective of timing variations and drift of characteristics.

FIGS. a–d are graphs illustrating waveforms useful in explaining the operation of the invention.

DESCRIPTION OF THE PREFERRED EMBODIMENT

Figure 1:
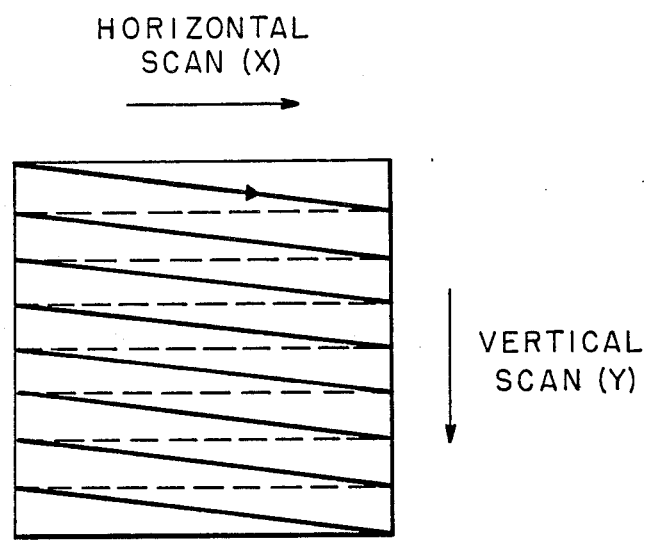
FIG. 1 is a graphical representation of a television raster scan. A television image is generated by the left-to-right, top-to-bottom scan of an intensity modulated electron beam.

Referring to FIG. 1, a conventional television raster scan is graphically illustrated. In the present embodiment, the raster scan begins just offscreen in the upper lefthand corner and ends just offscreen in the lower righthand corner. Conventionally, the television frames may be interlaced by alternately displaying the odd and even Y lines.

Figure 2:
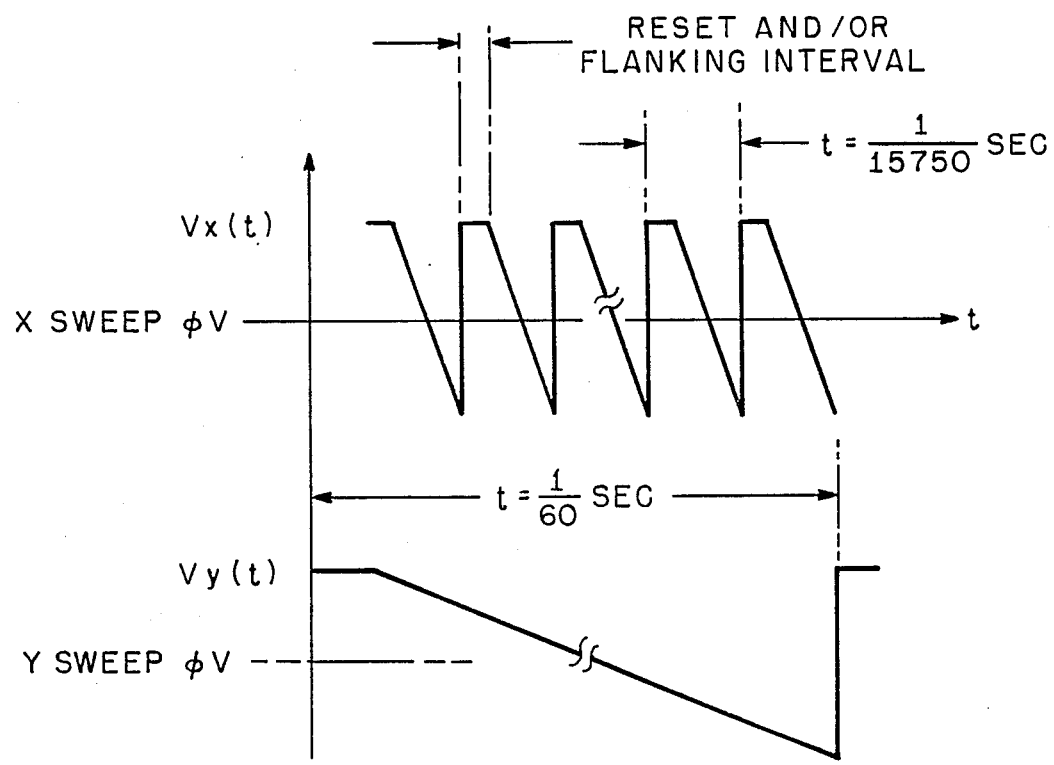
FIG. 2 is a graph illustrating the display deflection waveforms. The horizontal (X) and vertical (Y) deflection signals control the position of the electron beam.

Referring to FIG. 2, the deflection waveforms illustrated provide an accurately positioned television image. It is noted that each of the sweep waveforms is linear and d.c. balanced. For each X sweep and Y sweep, the beam crosses screen center when the deflection waveform is zero volts. Thus, for a correctly positioned image, the active portion of each sweep is positive and negative for equal periods of time if the reset or blanking interval is eliminated. If the center of the image should drift horizontally from screen center, the X sweep waveforms would no longer be d.c. balanced.

Similarly, if the center of the image should drift vertically from screen center, the Y sweep waveforms would no longer be d.c. balanced. This property is utilized in a manner to be later described in maintaining the center of the TV image at screen center. The size and position of the television image depend on the absolute accuracy of the X and Y deflection waveforms.

Figure 3:
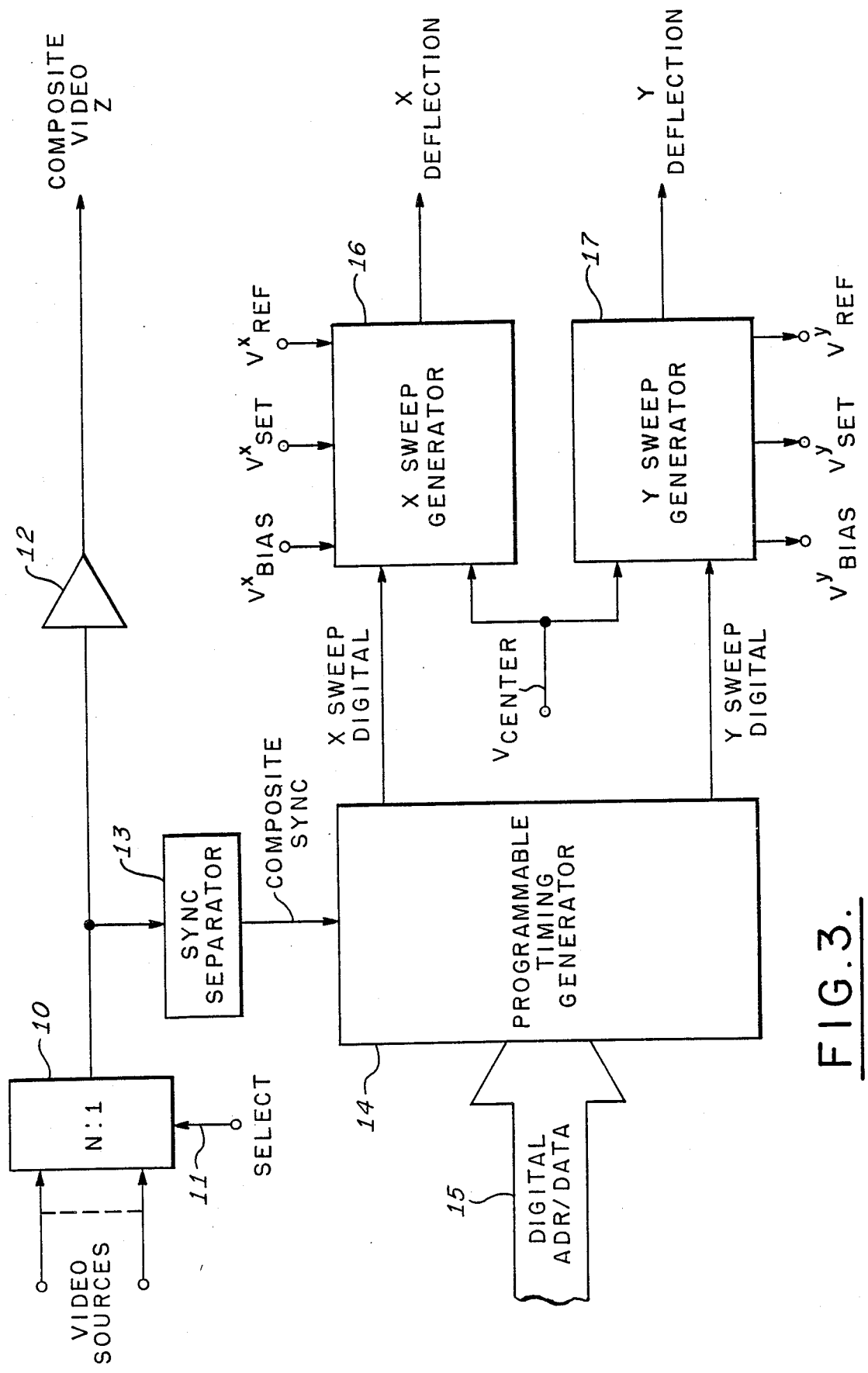
FIG. 3 is a schematic block diagram of a display channel raster deflection generator implemented in accordance with the present invention.

Referring to FIG. 3, a schematic block diagram of the display raster deflection generator of the present invention is illustrated. A plurality of composite video (television) signals is received by an N-to1 multiplexer 10. The composite video signals are provided from the sensor video sources of the system. A system central computer (not shown) selects one of the video sources by a select signal on a line 11 and provides the selected video via a video amplifier 12 to the display device on which the television image is to be generated. The horizontal and vertical synchronization signals are separated in a sync separator 13 and the resulting composite sync signals are applied to a programmable timing generator 14. In a manner to be described, the programmable timing generator 14 is initialized by the central computer via an address and data bus 15 to store the parameters required to tailor the X and Y deflection signals in accordance with the selected video source and the particular display device to be utilized. The programmable timing generator 14 provides digital X and Y sweep signals to an X-sweep generator 16 and a Y-sweep generator 17, respectively. In response to the digital sweep signals, the sweep generators 16 and 17 provide the X deflection and the Y deflection signals illustrated in FIG. 2 which comprise a pair of accurately d.c.-balanced sweep waveforms capable of high-accuracy placement of the television image on the CRT display.

The raster deflection generator of FIG. 3 generates the horizontal and vertical deflection waveforms to precisely place the sensor video information on the CRT display device. In a manner to be described, individual sensor variations are accommodated by the programmable timing generator 14 which tailors the digital X and Y sweep control signals applied to the analog sweep generators 16 and 17. In a manner to be further described, the analog generators 16 and 17 utilize feedback to assure an accurate and repeatable pair of output deflection waveforms. The X-sweep generator 16 receives a $V_{BIAS}$ signal, a $V_{SET}$ signal, and a $V_{REF}$ signal to generate the X deflection sweep signal illustrated in FIG. 2. Similarly, the Y-sweep generator 17 received a $V_{BIAS}$ signal, a $V_{SET}$ signal and a $V_{REF}$ signal to generate the Y deflection sweep signal illustrated in FIG. 2. Both sweep generators 16 and 17 receive a $V_{CENTER}$ signal utilized within the sweep generators 16 and 17 as a threshold signal for maintaining the television image centered on the CRT screen in a manner to be described.

Figure 4:
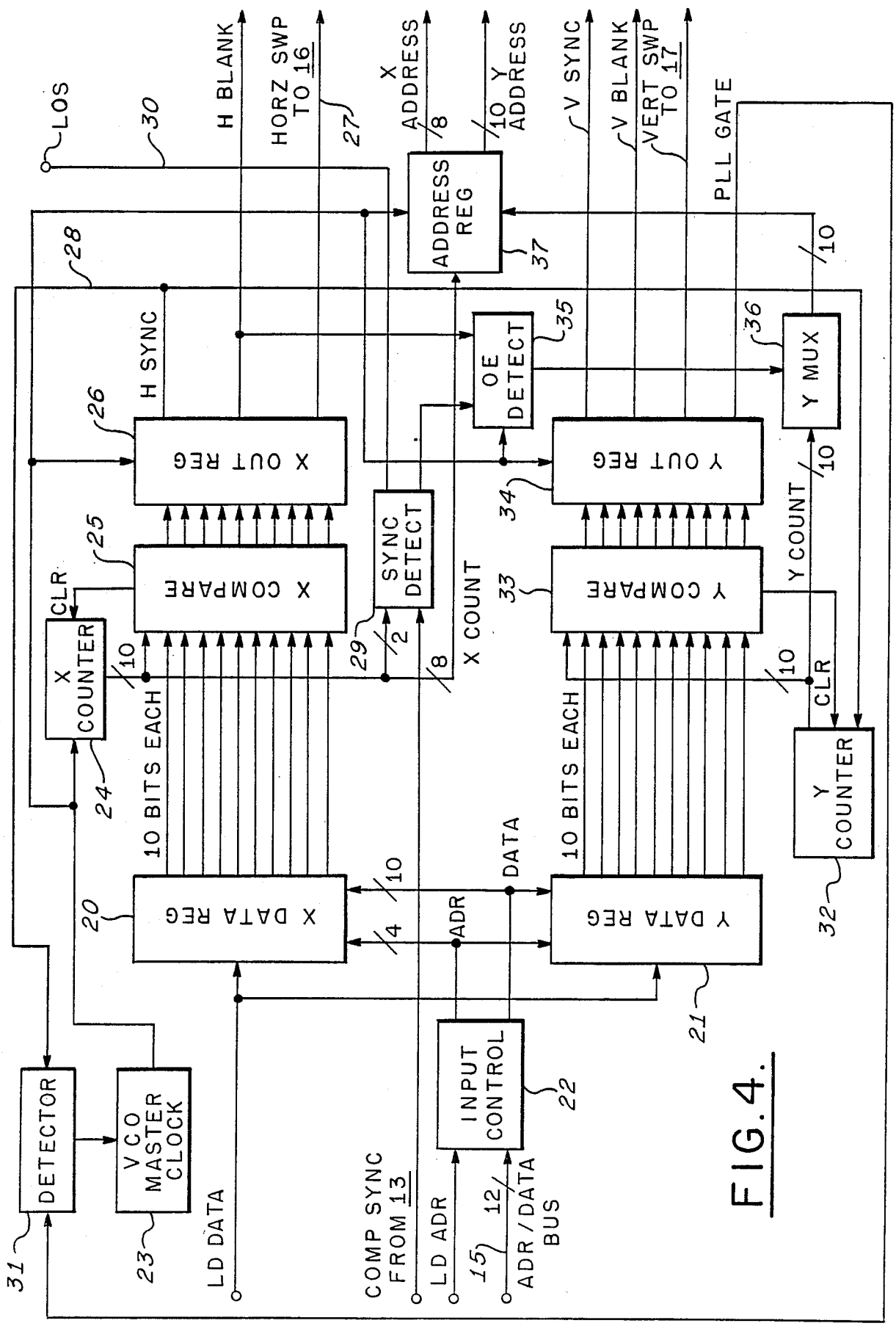
FIG. 4 is a schematic block diagram illustrating details of the programmable timing generator of FIG. 3.

Referring to FIG. 4, details of the programmable timing generator 14 of FIG. 3 are illustrated. The programmable timing generator 14 includes X data registers 20 and Y data registers 21 for storing control values corresponding to the video source selected by the central computer. When the central computer selects a new video source, corresponding timing control values are uploaded into the digital data files 20 and 21. The address/data bus 15 from the central computer is coupled to an input control section 22 and receives a load address signal from the computer. The load address signal controls entering the appropriate data file addresses into the input control section 22 for routing the data to the appropriate data files. A load data signal from the central computer applied to the data files 20 and 21 controls entering the timing control values from the data bus 15 into the appropriate X and Y data file registers specified by the addresses. The data words are ten bits wide and a total of ten registers each in X and Y is sufficient to specify all of the necessary programmable timing generator output characteristics. A master clock 23 drives a horizontal (X) ten bit counter 24, the ten bit output of which is applied to an X comparator 25. The comparator 25 compares the output of the X counter 24 with the ten bit output of each of the X data registers 20 and issues a signal to an X output register 26 when equality occurs. When the states of the X counter 24 agree with the timing values stored in the data files 20, an output of the X output register 26 changes to provide the horizontal (X) sweep control signal of the present invention in a manner to be explained. The programmable timing generator 14 also provides the various synchronizing and blanking pulses required by the display. The X output register 26 provides the horizontal sweep control signal to the X-sweep generator 16 of FIG. 3 on a line 27. The X output register 26 also provides a horizontal synchronizing pulse on a line 28.

The composite sync signal from the sync separator 13 of FIG. 3 is applied to a sync detector 29 that extracts the horizontal sync signal from the selected video input and provides this signal on a line 30. The sync detector 29 is responsive to the two most significant bits from the X counter 24 to ensure that only the desired horizontal synchronizing information is processed. The two MSB from the X counter 24 are utilized, in a conventional manner, to gate through such desired horizontal synchronizing information while blocking extraneous timing pulses present in certain video formats during the vertical sync interval. These pulses are blocked to assure proper operation of the servo loop in which the signal on the line 30 is utilized. The two bits of address provide qualification to approximately one-quarter horizontal line time.

The signal on the line 30 may be referred to as a lock-on sync (LOS) signal. The detected sync information on the line 30 and the horizontal synchronizing output on the line 28 from the X output register 26 are applied to a phase detector 31, the output of which provides an input to the master clock 23. The master clock 23 is a voltage controlled oscillator having a frequency that is adjusted by the phase detector 31 to cause the two synchronizing signals on the lines 28 and 30 to be in-phase. Thus, the components 23, 28–31 comprise a phase locked loop that servoes the output signals of the programmable timing generator 14 to the input video signal. The comparator 25 also provides an output to the clear input of the X counter 24 so as to specify the maximum value of the counter range.

The programmable timing generator 14 includes a vertical (Y) counter 32 coupled to count the horizontal sync pulses on the line 28. The Y counter 32 is ten bits wide and provides its output to a Y comparator 33. The Y comparator 33 also receives the outputs from the Y data registers 21 in a manner similar to that described above with respect to the X comparator 25. A Y output register 34 is coupled to receive the outputs from the Y comparator 33 and generates the vertical signals of the programmable timing generator 14. The signals from the Y output register 34 include the vertical sweep control signal applied to the Y-sweep generator 17 of FIG. 3 as well as a vertical sync and vertical blanking pulse. The Y output register 34 also provides a phase locked loop (PLL) gate for disabling the phase detector 31 during vertical flyback to prevent anamolous operation in a manner similar to the sample and hold circuit 61 to be discussed with respect to FIG. 5. The Y comparator 33 also provides a signal to clear the Y counter 32 so as to specify the maximum value of the counter range.

The programmable timing generator 14 includes an odd/even detect circuit 35 to detect the odd and even raster lines for use in a system employing alternate odd/even framing. The odd/even detect circuit 35 is responsive to the vertical synchronizing pulse stripped from the composite sync by the sync detector 29 and the horizontal blanking pulse from the X output register 26 for detecting the odd and even raster lines. The ten bit output of the Y counter 32 and the output of the odd/even detector 35 are applied to a Y multiplexer 36 for providing all the even Y addresses and then all the odd Y addresses.

The eight least significant bits from the X counter 25 and the ten Y address bits from the Y multiplexer 36 are applied to an address register 37. The address register 37 provides complete sets of horizontal and vertical addresses useable for accessing RAM image data memories. The output of the master clock 23 is applied to the X output register 26, the Y output register 34, the odd/even detector circuit 35 and the address register 37 for system timing purposes.

Thus, it is appreciated that the programmable timing generator 14 is architectured to utilize the repetitive behavior of television video signals. Each horizontal and vertical interval is decomposed into a number of critical events, e.g., start synch/stop sync. The vertical and horizontal structures each contains the ten bit counter described which is incremented at the appropriate rate. As each of the counters 24 and 32 increments, the value therein is compared continuously with the values stored in the multiplicity of data registers 20 and 21, respectively. When the values agree, an output event occurs that is utilized to control the activities of the display system in which the invention is utilized.

The resolution of the programmable timing generator 14 is determined by the speed at which the logic elements of which it is constructed can function. Typically, a horizontal line time is divided into about 600 events by the high frequency master clock 23. The resolution may therefore be as fine as one part in 600 in the horizontal aspect. Vertical resolution is on the order of a half-line time and thus is typically one part in 500 to 1,000.

Figure 5:
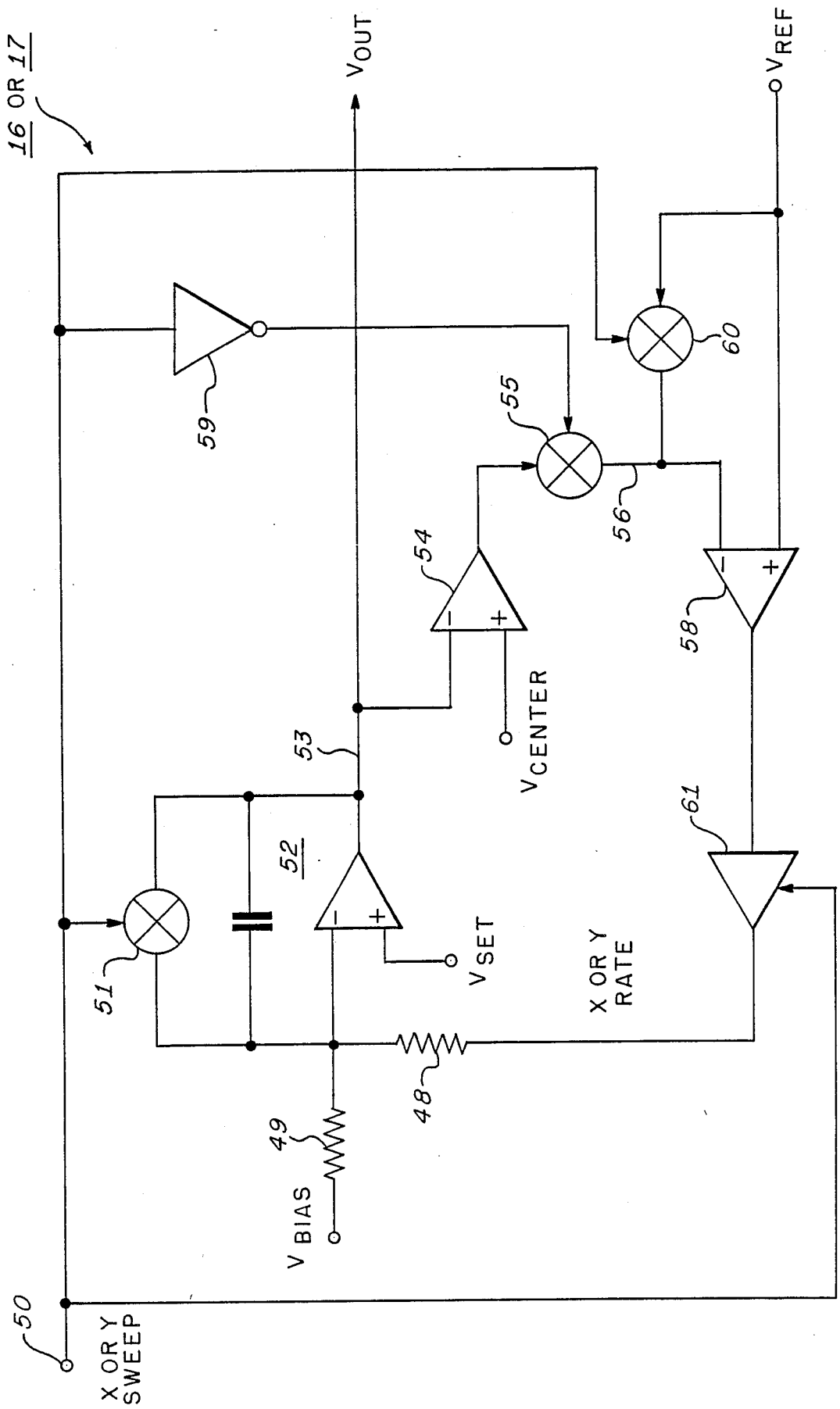
FIG. 5 is a schematic block diagram illustrating details of each of the X-sweep generator and the Y-sweep generator of FIG. 3.

Referring now to FIG. 5, details of the X sweep generator 16 and the Y sweep generator 17 of FIG. 3 are illustrated. Since the X sweep generator 16 is substantially identical to the Y sweep generator 17, except for parameter values, the details of the only one such sweep generator are provided. The periodic control waveform (horizontal (X) or vertical (Y) sweep) from the programmable timing generator 14 is applied to the analog sweep generator of FIG. 5 at a terminal 50. The sweep control signal at the terminal 50 is applied to a reset switch 51 connected across an operational amplifier integrator 52. With the switch 51 closed, the output $V_{OUT}$ on a line 53 holds at a fixed value equal to $V_{SET}$. In the switch-closed position, the output voltage on the line 53 is such that the CRT beam resides off the left and top screen edges. With the reset switch 51 open, the integrator output on the line 53 slews at a steady time rate-of-change to generate a linear sweep waveform. Thus, when the reset switch 51 is opened, the integrator output on the line 53 begins sweeping linearly toward the opposite voltage polarity.

The integrator output on the line 53 is applied to a voltage comparator 54 that senses the time at which the integrator output crosses a predetermined voltage level. Preferably, the voltage level is selected as zero volts corresponding to the CRT screen center. Thus, a threshold signal $V_{CENTER}$ is applied to the comparator 54, and in the preferred embodiment of the invention, $V_{CENTER}$ is zero volts. The voltage comparator 54 functions such that when the voltage on the line 53 is greater than $V_{CENTER}$, the comparator 54 outputs $2V_{REF}$. When the voltage on the line 53 is less than $V_{CENTER}$, the comparator 54 outputs zero volts.

The output of the comparator 54 is applied through a synchronizing switch 55 and a line 56 to the inverting input of an error integrator 58. The synchronizing switch 55 is operated through an inverter 59 by the sweep control waveform applied to the terminal 50. A reference voltage $V_{REF}$ is applied to the noninverting input of the error integrator 58 and through a synchronizing switch 60 to the line 56. The synchronizing switch 60 is also operated by the sweep control waveform applied to the terminal 50. Operation is effected such that when the reset switch 51 is opened, the synchronizing switch 60 is also opened and the synchronizing switch 55 is closed. Conversely, when the reset switch 51 is closed, the synchronizing switch 60 is also closed and the synchronizing switch 55 is opened.

The output of the error integrator 58 is applied to a sample and hold circuit 61 which is also strobed by the sweep control waveform applied at the terminal 50. Alternatively, the sample and hold circuit 61 may be strobed by the HSYNC signal on the line 28 (FIG. 4) or an equivalent signal. The output of the sample and hold circuit 61 is applied through a resistor 48 to the inverting input of the integrator 52 which also receives a bias signal $V_{BIAS}$ through a resistor 49. A $V_{SET}$ signal is applied to the non-inverting input of the integrator 52. The junction between the resistors 48 and 49 from a current summing node input to the integrator 52.

In a manner to be further detailed, the sweep control waveform at the terminal 50 periodically opens and closes the reset switch 51 and the synchronizing switches 55 and 60 such that a sequence of linear raster sweeps are generated by the integrator 52. As previously discussed with respect to FIG. 2, if the sweep is symmetrical with respect to zero volts at screen center, the comparator 54 will provide a square wave with a 50% duty cycle and an amplitude that switches between $2V_{REF}$ and zero. During the generation of a sweep, the switch 55 is closed and the switch 60 is opened. For a properly centered sweep, the input to the inverting input of the error integrator 58 will be $2V_{REF}$ for half of the sweep time and zero for the other half of the sweep time. Since $V_{REF}$ is applied to the non-inverting input of the error integrator 58 and the 50% duty cycle square wave applied to the inverting input thereof will integrate to a level of $V_{REF}$ during the sweep time, at the end of the sweep the error output of the error integrator 58 for a properly centered sweep is zero. It is appreciated that the actions described with respect to the square wave duty cycle are predicted on eliminating the reset or blanking interval shown in FIG. 2. In the operation of the present invention, this occurs because of the functioning of the synchronizing switches 55 and 60 as described.

The sample and hold circuit 61 is strobed when the reset switch 51 is closed thus providing the error sample when the sweep is not active. If the sweep should drift from screen center, the error integrator 58 will generate a positive or negative error signal which when applied to the integrator 52 via the sample and hold circuit 61 changes the integrator 52 sweep rate so as to recenter the television picture. Thus, the TV image is servoed to screen center. By appropriate generation of the sweep control waveform at the terminal 50 and appropriate selection of $V_{SET}$, the raster sweep waveform will be properly scaled to precisely control the beam from one edge of the screen to the other.

During sweep flyback, the reset switch 51 is closed, the synchronizing switch 55 is opened and the synchronizing switch 60 is closed. During this interval, $V_{REF}$ is applied to the inverting input of the error integrator 58 through the switch 60 as well as to the non-inverting input thereof to hold the input of the integrator 58 at zero during the flyback time. Thus, the output of the error integrator 58 is maintained constant during the retrace interval. This operation of the synchronizing switches 55 and 60 effectively eliminates the retrace interval from the error determination process. Thus, the duty cycle interval of the square wave from the comparator 54 is independent of the period chosen for blanking and/or retrace.

It is appreciated that the output of the error integrator 58 may be sampled at the end of the sweep just before the retrace/sync but may also be sampled during the retrace or sync interval. The differential input of the error integrator 58 is forced to zero during the retrace interval to prevent integrating the retrace and thus introducing anamolous signals as well as to hold the output of the error integrator 58 constant during the sample interval. The purpose of sampling the output of the error integrator 58 during the retrace and holding that value in the sample and hold circuit 61 during the sweep period is to provide the ramp generating integrator 52 with a constant input so that the sweep will be linear.

Thus, it is appreciated that the time variations caused by device and component tolerance variations form a duty cycle value which is filtered (integrated) and fed back to the sweep generator 52 to form automatically the repeatable and accurately centered and scaled deflection waveforms. The comparator 54 may be considered as a phase detector since the rate at which the integrator 52 sweeps affects the time to zero crossings of the repetitive waveforms. This duty cycle information is filtered by the error integrator 58 and fed back to the integrator 52 where the feedback term alters the integrator rate. During the closed or reset position of the switch 51, the output of the comparator 54 is not fed back to the error integrator 58 making the feedback independent of the reset or flyback time period. The filtering and feedback mechanism of FIG. 5 permits the loop to correct itself about screen center without introducing sweep linearity errors. The sample and hold mechanism 61 updates the corrected feedback voltage to the integrator 52 when the sweep is not active. This mechanism may utilize the same signal employed to control the integrator 52 for maximum economy of components.

Figure 6:
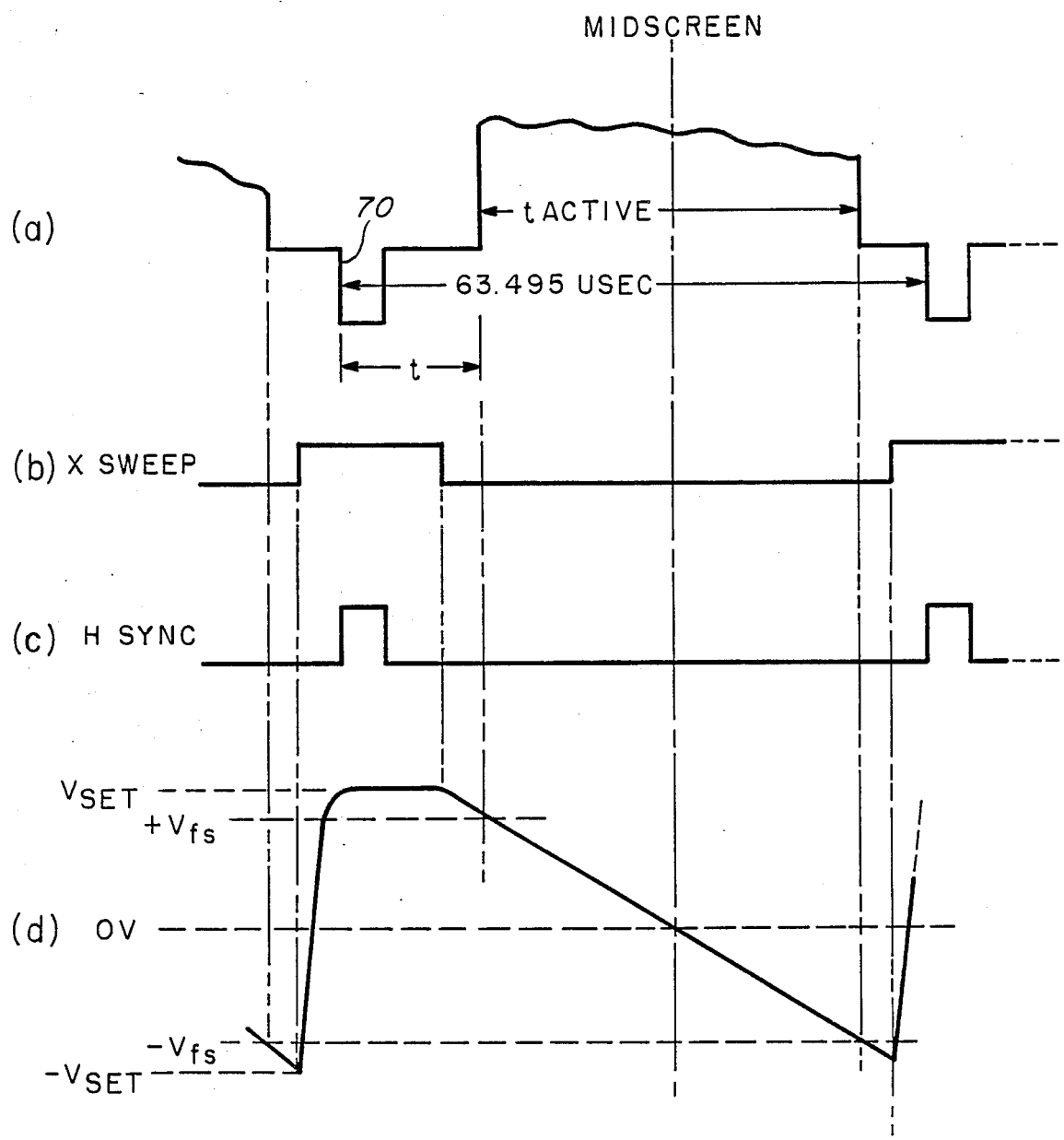

Referring to FIG. 6, a single horizontal sweep generation time of a sensor video input is illustrated. It is appreciated that similar waveforms are applicable to the vertical dimension. Waveform (A) illustrates that each sensor video input may have unique and different timing characteristics. The time t at which the horizontal sync pulse 70 occurs relative to the active video interval may vary from sensor to sensor. Additionally, the time t active may also vary from sensor to sensor.

Accordingly, by the phase locked loop techiques described above, the high frequency master clock 23 is synchronized to the sensor where the sweep values are programmable to permit fine time resolution. The programmable timing generator 14 (FIG. 4) generates the sweep control waveform (B) which is tailored to the individual sensor characteristics. The X sweep illustrated in waveform (B) exemplifies the horizontal sweep waveform provided on line 27 of the programmable timing generator 14 (FIG. 4). The rising edge of the X sweep closes the reset switch 51 and the synchronization switch 60 and opens the synchronization switch 55. The rising edge of the X sweep also strobes the sample and hold circuit 61 to acquire an error sample from the error amplifier 58. The falling edge of the X sweep waveform opens the reset switch 51 and the synchronization switch 60 and closes the synchronization switch 55. Waveform (C) illustrates the HSYNC pulse generated by the programmable timing generator 14 to synchronize the X sweep waveform (B) with the sensor horizontal sync pulse 70. Waveform (C) may also be utilized to strobe the sample and hold circuit 61 as an alternative to using the rising edge of the X sweep for this purpose. As illustrated in waveform (D), the programmable control causes a sweep voltage of the correct amplitude to be generated. The waveform is automatically screen centered as discussed above. The X sweep waveform (B) as well as the Y sweep waveform are tailored by the data stored in the X and Y data registers 20 and 21 of the programmable timing generator 14 such that the linear ramp portion of waveform (D) varies between the positive full screen voltage $+V_{FS}$ and the negative full screen voltage $-V_{FS}$ in coincidence with the occurrence of the video t active region of waveform (A).

It is therefore appreciated that the comparator 54 (FIG. 5) evaluates the time at which the deflection voltage equals zero. Discounting the X-sweep reset or blanking interval, a correctly scaled sweep exhibits that condition at a 50% time duty cycle. The output of the comparator 54 drives the error integrator 58 to provide an average duty cycle control voltage utilized to correct the sweep. When the sweep is centered, the ends thereof have the correct scale factor.

The apparatus of the present invention receives a multiplicity of sensor television inputs and generates the horizontal and vertical deflection waveforms in synchronism with a selected input so as to precisely place the sensor video information on a CRT display device. The present invention corrects the signal variations resulting from the multiplicity of input characteristics by utilizing the techniques described above. Firstly, the described electronic feedback automatically causes the sweep waveforms to be screen centered on the CRT display. Secondly, the drive signals controlling the generation of the deflection signals are programmable so as to permit the feedback mechanism to accommodate the systematic variations. The use of the programmable timing generator 14 permits the compensation to be extended to adjust for a large number of input characteristics.

The control outputs of the programmable timing generator 14, includes the horizontal and vertical sweep control signals, are programmable at arbitrary start and stop times. Prior art approaches to control signal generation rely on large quantities of non-volatile memory whereas the present invention utilizes data register storage of the critical on and off times of the repetitive signals. The present invention may utilize non-volatile memory external to the device to store the operating parameters. Because of the economy of modern PROM devices, sufficient memory space may be provided outside of the programmable timing generator 14 to permit a multiplicity of operating modes. The extension of this concept thus characterizes each of the system sensor video inputs and adjusts the performance of the analog sweep generators accordingly. It is appreciated that many of the systematic error effects such as comparator delay and any CRT display deflection delay are accommodated by preemphasizing or leading the control signals from the programmable timing generator 14.

It is appreciated from the foregoing that the present invention provides a high precision sawtooth deflection waveform generator for CRT displays that utilizes closed loop feedback to ensure accurate voltage level and symmetry characteristics that are independent of environmental or component variations. The invention automatically corrects the output waveforms both for variations of the components utilized to construct the invention as well as for external timing variations. The invention eliminates the requirements for critical construction or adjustments to achieve accurate amplitude and timing control. The invention further eliminates almost all precise components and the effects of component aging and drift. The invention is readily programmable without hardware adjustments.

The performance resulting from utilizing the present invention permits the accurate presentation of a variety of television formats while retaining simplicity of physical components and immunity from environmentally related variations such as temperature effects.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Raster deflection signal generation apparatus for use in a video display system having at least one video input channel for displaying a video image on a CRT screen, comprising
    programmable timing generator means for providing sweep control signals in accordance with predetermined timing characteristics of said channel and synchronized to a first sync signal said programmable timing generator means including,
    means for providing said first sync signal,
    means for providing a second sync signal from a composite video signal supplied by said at least one video input channel
    phase detector means responsive to said first and second sync signals for providing an error signal representative of a phase difference therebetween,
    oscillator means coupled to said first sync means and responsive to said error signal for providing a clock signal at a frequency that phase locks said first and second sync signals,
    raster sweep generation means responsive to said sweep control signals for generating raster deflection signals, and
    servo means responsive to said raster deflection signals for maintaining said raster deflection signals positioned with respect to a predetermined reference so that said video image remains centered on said CRT screen.

2. The apparatus of claim 1 wherein said programmable timing generator means comprises:
    first and second storage means for storing respective first and second sets of digital words utilized to generate first and second sweep control signals, respectively,
    first digital counter means coupled to count said clock signal,
    first comparator means coupled to said first counter means and to said first storage means for comparing said first counter means digital output signal with said digital words stored in said first storage means for providing signals in accordance with equality therebetween, said equality signals utilized to provide said first sweep control signal and said first sync signal,
    second digital counter means coupled to count said first sync signal, and
    second comparator means coupled to said second digital counter means and to said second storage means for comparing said second digital counter means digital output signal with said digital words stored in said second storage means for providing signals in accordance with equality therebetween, said equality signals utilized to provide said second sweep control signal.

3. The apparatus of claim 1 wherein said servo means includes
    comparator means responsive to a raster deflection signal for providing a duty cycle signal having a first signal level when said raster deflection signal is greater than a predetermined reference signal and a second signal level when said raster deflection signal is less than said predetermined reference signal, said duty cycle signal having said first and second signal levels for equal periods of time when said raster deflection signal is symmetrical with respect to said predetermined reference signal
    means responsive to said duty cycle signal for providing an error signal in accordance with deviations of said raster deflection signal from said predetermined reference signal and
    means for coupling said error signal to said raster sweep generation means for controlling said raster sweep generation means and maintain said raster deflection signal symmetrically positioned with respect to said predetermined reference.

4. The apparatus of claim 3 wherein said predetermined reference comprises a voltage representative of the center of said CRT screen.

5. The apparatus of claim 3 wherein said coupling means comprises sample and hold means responsive to said error signal for sampling said error signal and holding a signal samples thereof.

6. The apparatus of claim 5 wherein said raster sweep generation means comprises
    integrator means, and
    a reset switch coupled across said integrator means and responsive to a sweep control signal for enabling and resetting said integrator means in accordance with said sweep control signal.

7. The apparatus of claim 6 wherein said integrator means is coupled to receive said signal samples for altering said integrator sweep rate in accordance with said error signal.

8. The apparatus of claim 7 wherein said sample and hold means is responsive to said sweep control signal for sampling said error signal.

9. The apparatus of claim 8 wherein said sweep control signal is generated and said sample and hold circuit is configured to sample said error signal when said integrator means is reset by said reset switch.

* * * * *